(12) United States Patent
Mirabella et al.

(10) Patent No.: US 11,230,061 B2
(45) Date of Patent: Jan. 25, 2022

(54) SYSTEM AND METHOD FOR OPTIMIZING TOOL PATHS BASED ON THERMAL/STRUCTURAL SIMULATIONS OF A PART BEING PRODUCED VIA A 3D-PRINTER

(71) Applicant: Siemens Industry Software Inc., Plano, TX (US)

(72) Inventors: Lucia Mirabella, Plainsboro, NJ (US); Louis Komzsik, Huntington Beach, CA (US); Yunhua Fu, Monmouth Junction, NJ (US)

(73) Assignee: Siemens Industry Software Inc., Plano, TX (US)

( * ) Notice: Subject to any disclaimer, the term of this patent is extended or adjusted under 35 U.S.C. 154(b) by 588 days.

(21) Appl. No.: 15/768,127

(22) PCT Filed: Mar. 29, 2016

(86) PCT No.: PCT/US2016/024695
§ 371 (c)(1),
(2) Date: Apr. 13, 2018

(87) PCT Pub. No.: WO2017/074490
PCT Pub. Date: May 4, 2017

(65) Prior Publication Data
US 2018/0314235 A1 Nov. 1, 2018

Related U.S. Application Data

(60) Provisional application No. 62/247,241, filed on Oct. 28, 2015.

(51) Int. Cl.
*B29C 64/386* (2017.01)
*B33Y 50/00* (2015.01)
(Continued)

(52) U.S. Cl.
CPC ............ *B29C 64/386* (2017.08); *B33Y 50/00* (2014.12); *B33Y 50/02* (2014.12);
(Continued)

(58) Field of Classification Search
CPC ....... B29C 64/386; B33Y 50/00; B33Y 50/02; G06F 30/23; G06F 2119/18;
(Continued)

(56) References Cited

U.S. PATENT DOCUMENTS

| | | | |
|---|---|---|---|
| 6,934,600 B2 * | 8/2005 | Jang ........................ | B82Y 30/00 |
| | | | 700/182 |
| 9,644,489 B1 * | 5/2017 | Tham ...................... | B33Y 10/00 |

(Continued)

FOREIGN PATENT DOCUMENTS

| | | |
|---|---|---|
| CN | 103752823 A | 4/2014 |
| CN | 103769587 A | 5/2014 |

(Continued)

OTHER PUBLICATIONS

Michael F. Zaeh and Gregor Branner, "Investigations on residual stresses and deformations in selective laser melting", Production Engineering, vol. 4, No. I, Feb. 1, 2010, pp. 35-45.

(Continued)

*Primary Examiner* — Thai Q Phan

(57) ABSTRACT

A system and method is provided that facilitates optimizing tool paths based on thermal/structural simulations of a part produced via a 3D-printer. A processor may carry out a first simulation of the part being additively produced according to a first set of tool paths that correspond to instructions usable to drive the 3D-printer to produce the part. The first simulation may include: determining a hexahedral mesh of the part that includes a plurality of hexahedron elements; determining an order of the elements of the mesh to deposit for additively producing the part based on the first set of tool (Continued)

paths; and simulating an incremental deposit of each of the elements of the mesh in the order that the elements are determined to be deposited. For each incremental deposit of an additional respective element, thermal characteristics and structural deformation characteristics of the deposited elements are determined, in which some elements have a change in volume to account for a structural deformation of previously deposited adjacent elements.

20 Claims, 8 Drawing Sheets

(51) Int. Cl.
  *G06F 30/23* (2020.01)
  *B33Y 50/02* (2015.01)
  *G05B 19/4099* (2006.01)
  *G06F 119/18* (2020.01)

(52) U.S. Cl.
  CPC ......... *G05B 19/4099* (2013.01); *G06F 30/23* (2020.01); *G05B 2219/35134* (2013.01); *G05B 2219/49007* (2013.01); *G06F 2119/18* (2020.01); *Y02P 90/02* (2015.11)

(58) Field of Classification Search
  CPC ........... G05B 2219/35134; G05B 2219/49007; G05B 19/4099
  USPC .................................................. 703/2, 5, 7
  See application file for complete search history.

(56) References Cited

U.S. PATENT DOCUMENTS

| | | | | |
|---|---|---|---|---|
| 10,518,480 B2* | 12/2019 | Putman | .................. | G06N 20/10 |
| 10,589,878 B2* | 3/2020 | Veto | .................. | B64G 1/402 |
| 2013/0331927 A1* | 12/2013 | Zheng | .................. | A61F 2/915 |
| | | | | 623/1.19 |
| 2014/0167326 A1 | 6/2014 | Jones et al. | | |
| 2015/0320577 A1* | 11/2015 | Zheng | .................. | A61F 2/915 |
| | | | | 623/1.15 |
| 2017/0129186 A1* | 5/2017 | Sauti | .................. | B33Y 50/02 |
| 2017/0341180 A1* | 11/2017 | Zediker | .............. | B23K 26/0622 |
| 2018/0229863 A1* | 8/2018 | Veto | .................. | B64G 1/402 |
| 2019/0076925 A1* | 3/2019 | Lakshman | .............. | B33Y 30/00 |

FOREIGN PATENT DOCUMENTS

| | | |
|---|---|---|
| CN | 104050314 A | 9/2014 |
| CN | 104504186 A | 4/2015 |
| WO | 2015184495 A1 | 12/2015 |

OTHER PUBLICATIONS

Jamasp Jhabvala, Eric Boillat, Thibaud Antignac and Remy Glardon, "On the effect of scanning strategies in the selective laser melting process", Virtual and Physical Prototypng, vol. 5, No. 2, Jun. 1, 2010, pp. 99-109.

Ahmed Hussein, Liang Hao, Chunze Yan, Richard Everson, "Finite element simulation of the temperature and stress fields in single layers built without-support in selective laser melting", Elsevier, Materials and Design, vol. 52, pp. 638-647, Great Britain.

PCT International Search Report and Written Opinion dated Jul. 21, 2016 corresponding to PCT Application No. PCT/US2016/024695 filed Mar. 29, 2016.

Yang, Yonggiang et al.: "Manufacturing change design-3D printing direct manufacturing technology"; Chinese Science and Technology Press; p. 50, Jun. 30, 2014, 3 pages.

Chinese office action dated Oct. 11, 2021, for CN Application No. 201680063304.X.

* cited by examiner

SYSTEM AND METHOD FOR OPTIMIZING TOOL PATHS BASED ON THERMAL/STRUCTURAL SIMULATIONS OF A PART BEING PRODUCED VIA A 3D-PRINTER

TECHNICAL FIELD

The present disclosure is directed, in general, to computer-aided design (CAD), computer-aided manufacturing (CAM), computer-aided engineering (CAE), visualization, simulation, and manufacturing systems, product data management (PDM) systems, product lifecycle management (PLM) systems, and similar systems, that are used to create, use, and manage data for products and other items (collectively referred to herein as product systems).

BACKGROUND

Product systems may be used to generate instructions that are usable to drive a 3D-printer to additively produce a part. Such product systems may benefit from improvements.

SUMMARY

Variously disclosed embodiments include data processing systems and methods that may be used to facilitate optimizing tool paths of a laser of a 3D-printer based on thermal/structural simulations of a part being produced via the 3D-printer. In one example, a system may comprise at least one processor configured to carry out a first simulation of a part being additively produced according to a first set of tool paths that correspond to instructions usable to drive the 3D-printer to move a laser to additively produce the part.

For the first simulation, the at least one processor may be configured to: determining a mesh of the part that partitions the space of the part into a plurality of three dimensional (3D) elements; determine an order of the elements of the mesh to deposit for additively producing the part based on the first set of tool paths; and simulate an incremental deposit of each of the elements of the mesh in the order that the elements are determined to be deposited. For each incremental deposit of an additional respective element, the at least one processor may determine thermal characteristics and structural deformation characteristics of the deposited elements, in which at least one of the respective elements is structurally modified prior to determining the thermal and structural deformation characteristics of the respective element so as to account for a volume change to the respective element resulting from structural deformation of at least one adjacent element determined from previously determined structural deformation characteristics.

In another example, a method for optimizing tool paths based on thermal/structural simulations of a part being produced via a 3D-printer may comprise through operation of at least one processor, carrying out a first simulation of a part being additively produced according to a first set of tool paths that correspond to instructions usable to drive the 3D-printer to move a laser to additively produce the part. Such a first simulation may include: determining a mesh of the part that partitions the space of the part into a plurality of 3D elements; determining an order of the elements of the mesh to deposit for additively producing the part based on the first set of tool paths; and simulating an incremental deposit of each of the elements of the mesh in the order that the elements are determined to be deposited. For each incremental deposit of an additional respective element, thermal characteristics and structural deformation characteristics of the deposited elements are determined, in which at least one of the respective elements is structurally modified prior to determining the thermal and structural deformation characteristics of the respective element so as to account for a volume change to the respective element resulting from structural deformation of at least one adjacent element determined from previously determined structural deformation characteristics.

A further example may include non-transitory computer readable medium encoded with executable instructions (such as a software component on a storage device) that when executed, causes at least one processor to carry out this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
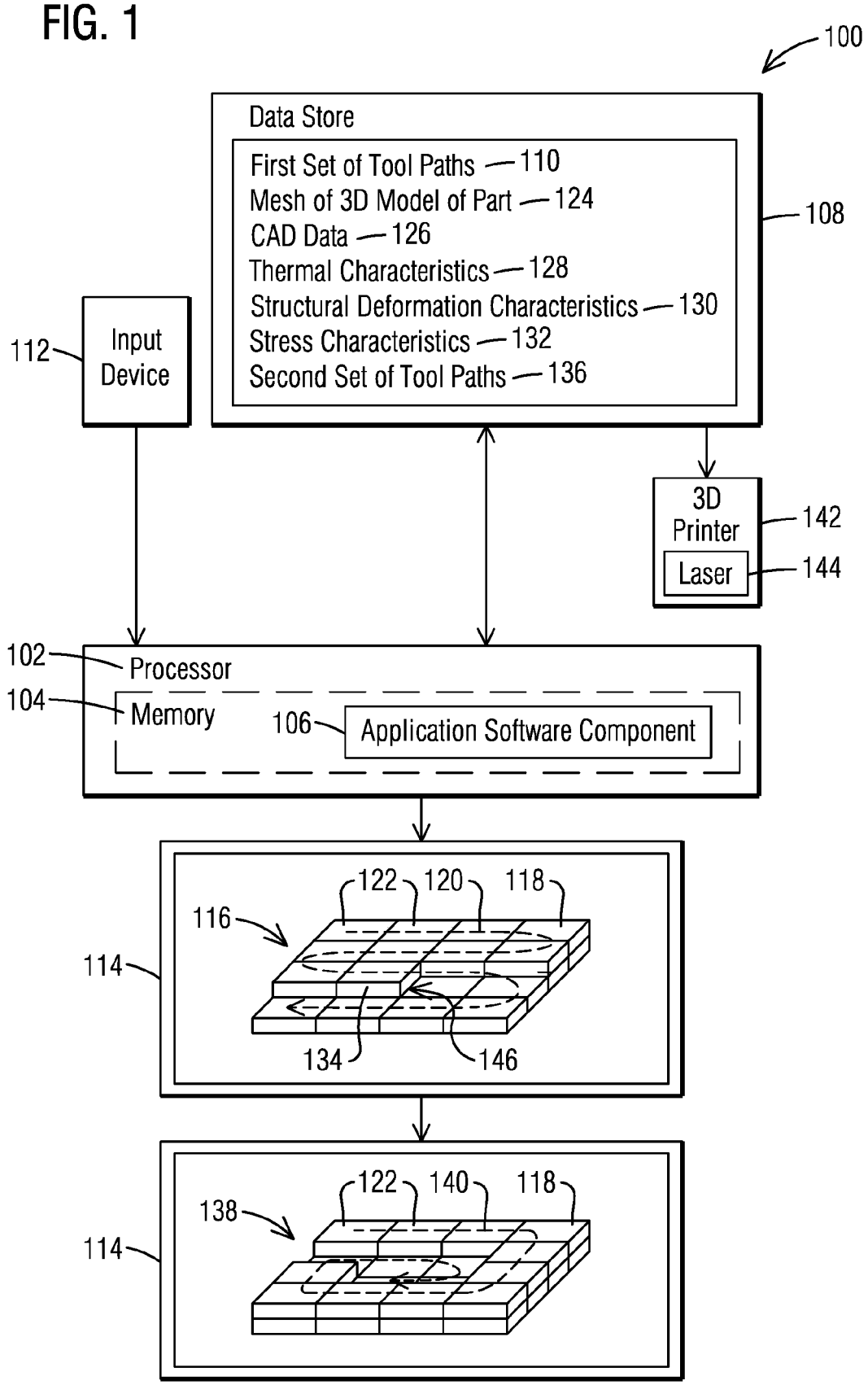
FIG. 1 illustrates a functional block diagram of an example system that facilitates optimizing tool paths of a laser of a 3D-printer based on thermal/structural simulations of a part being produced via the 3D-printer.

Various technologies that pertain to systems and methods that facilitate optimizing tool paths of a laser of a 3D-printer based on thermal/structural simulations of a part being produced via the 3D-printer will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, an example data processing system 100 is illustrated that facilitates optimizing tool paths of a laser 144 of a 3D-printer 142 based on thermal/structural simulations of a part being produced via the 3D-printer. The system 100 may include at least one processor 102 that is configured to execute at least one application software component 106 from a memory 104 accessed by the processor. The application software component may be configured (i.e., programmed) to cause the processor to carry out various acts and functions described herein. For example, the described application software component 106 may include and/or correspond to one or more components of a PLM software application that is configured to retrieve, generate, and store product data in a data store 108 such as a database, hard drive, SSD, memory card or other type of device that stores non-volatile data.

Examples of PLM software applications that may be adapted to carry out the features and functions described herein may include CAD, CAE, and CAM software such as the NX suite of applications and Solid Edge software, which are produced by Siemens Product Lifecycle Management Software Inc., of Plano, Tex. However, it should be appreciated that the systems and methods described herein may be used in other product systems (e.g., a simulation system) and/or any other type of system that generates and stores product data in a database. Also, examples of databases that may be used as one or more data stores described herein include database server applications such as Oracle, Microsoft SQL Server, or any other type of data store that is operative to store data records.

It should be understood that a 3D-printer corresponds to a machine capable of additively manufacturing (i.e., producing) a three dimensional (3D) article (i.e., a part) by depositing materials which bind together to form the physical structure of the article.

Examples of additive manufacturing processes employed by 3D-printers to build 3D parts using a high power laser to selectively sinter or melt a powdered material (typically metallic) include: selective laser sintering (SLS), selective laser melting (SLM) and directed energy deposition (DED). However, due to the presence of thermal gradients during heating and cooling, these processes may introduce residual stress, which can cause deformations (warping) and/or cracks on the part as the part cools. The presence of these defects can hinder tolerance and affect mechanical strength. However, the location and magnitude of such deformations are not always predictable based on the shape of the part, especially for complex geometries and complex melting paths (i.e., the laser tool paths). Example embodiments described herein correspond to a computer-aided simulation tool that can evaluate the locations and amounts of warping for arbitrary geometry and based on the results of the simulation, provide strategies (e.g., modified tool paths and/or modifications to the structure) that reduce warping, before manufacturing the part with the 3D-printer.

Such modified tool paths may include modifying the locations that the laser moves to ensure underlying material has sufficiently cooled before new material is sintered or melted thereon. Also modified tool paths may be generated that cause support structures to be additively built that minimize warping at identified locations on the part and that may be readily removed after the part is complete. In addition, useful modifications to the part that are determined or identified by the application software component may include thickening of a portion of the part to compensate for undesirable warping of material identified in an initial set of tool paths. Identifying and/or automatically generating such modified tool paths or modified design of the part, may minimize defects in the part and may reduce manufacturing costs and time for performing such analysis in an experimental setting.

To carry out these features, the described processor 102 may be configured (via the application software component 106) to carry out a first simulation of a part being additively produced according to a first set of tool paths 110 that correspond to instructions (such as GCode) that are usable to drive the 3D-printer 142 to additively produce the part. For example, the instructions may be usable to drive a 3D-printer to move a laser that produces a beam of laser light (or other type of deposition head), through a set of paths that sinters/melts powder material (or otherwise deposits material) so as to build up the part.

In some embodiments, such a simulation may be visually outputted to a user. For example, the system 100 may include a user interface that includes at least one input device 112 and a display device 114. The processor may cause the display device to output a graphical user interface (GUI) that includes a visual representation 116 of the simulation. Such a visual simulation may include an animation of the incremental build up of the part 118 as the tool (e.g., a laser and/or deposition head) of the 3D-printer moves according to the first set of tool paths 110. FIG. 1 shows a schematic visual broken line representation 120 of an example portion of the first set of tool paths 110 that the laser 144 will follow to build up the part 118 in order to form a block shape.

In this example, the processor may be configured to determine a mesh 124 of the part (such as a Cartesian hexahedral mesh having vertices/nodes and their connections) that partitions the space of the part into a plurality of 3D elements (i.e., cells or zones). The visual representation 116 graphically illustrates a portion of the elements 122 of the mesh that have been deposited to build up the lower portions of the part 118.

In example embodiments, the hexahedron shaped elements that make up the mesh may have dimensions based on configuration data for the 3D-printer that is desired to produce the part. For example, the height of the hexahedron elements for the mesh may correspond to one or more thicknesses of layers of material that the 3D-printer is capable of depositing. Also for example, the width of the hexahedron elements may correspond to the width of the material that the tool of the 3D-printer is capable of depositing. For a 3D-printer that uses a laser, such a width of the hexahedron elements may correspond to a laser beam diameter, which corresponds to the width of the powder that the laser is capable of sintering/melting as it moves along a tool path. In some embodiments, the hexahedron elements width or height may also be restricted by the geometry at the areas closer to the surface of the part.

In an example embodiment, the processor may be configured to determine an order of the elements 122 of the mesh to deposit to simulate additively producing (i.e., building up) the part 118 based on the first set of tool paths 110. For example, the order of the elements deposited may be based on a determination as to which hexahedrons of the hexahedral mesh intersect with an output of a tool (e.g., laser beam output) of the 3D-printer as the tool follows the set of tool paths 110 in order to add material (e.g., via sintering or melting powder) to form the part.

As used herein, the term deposit or depositing refers to the generation of additional material that is deposited onto the build plate and addition portions of the part. Thus a deposition head of a DED 3D-printer that both outputs and melts powder, is to be understood as carrying out a process of depositing the melted powder in a particular location. Similarly, for SLS and SLM 3D-printers that both inclemently apply a layer of powder followed by selectively sintering or melting portions of the powder, depositing of material corresponds to sintering or melting powder in a particular location. In addition, it should be noted that many of the examples described herein are with respect to SLS type 3D-printers. However, it should be appreciated that the described framework may be adapted for other types of additive manufacturing processes and 3D-printers, by modifying the input parameters provided and the boundary conditions.

In example embodiments, the determined tool paths 110 and mesh 124 may be stored in the memory 104 or the data store 108 for use with the functions described herein. In addition, data regarding the shape of the part may be stored in the memory and/or data store, which is usable by the processor to determine the tool paths and the mesh.

For example, the application software component may include one or more components capable of generating the tool paths and the mesh based on 3D-model data of the part defined by CAD data 126. Such CAD data may correspond for example to a CAD file in a format such as JT or STEP for storing geometric curves that define the shape of the part. In addition, it should also be appreciated that the 3D-model data, by which the tool paths and mesh are determined, may be generated from a 3D scan of an existing physical part.

The described application software component may include one or more CAD/CAM/CAE components capable of generating all three of the 3D model, mesh, and tool paths. However, it should also be appreciated that one or more of the CAD data 126, mesh 124, and/or tool path instructions (e.g., GCode that define the tool paths 110) may be generated by different systems/software and saved to one or more data stores 108 that are accessible to the at least one processor 102 that carries out the described simulation.

To carry out the first simulation, the processor 102 may simulate an incremental deposit of each of the elements 122 of the mesh in the order that the elements are determined to be deposited. For each incremental deposit of an additional respective element, the at least one processor determines thermal characteristics 128 and structural deformation characteristics 130 of the deposited elements.

For example, the element labeled with reference numeral 134 in FIG. 1, corresponds to the most recently deposited element along the path 120. At each incremental stage in the generation of the part 118, the processor may be configured to determine new/revised thermal characteristics (i.e., temperatures and/or temperate gradients) for at least the mostly recently deposited elements. As each element is deposited, many of the previously deposited elements may have cooled with the passage of time. Also, some of the elements (or portions thereof) adjacent to the most recently deposited element may increase in temperature with the transfer of heat from the laser and/or the most recently deposited element. To capture a simulation of these changes over time for the temperatures of the elements (and/or portions thereof), a new/revised set of thermal characteristics may be determined with the simulated incremental deposit of each additional element.

In addition, at each incremental stage in the generation of the part 118, the processor may be configured to evaluate the structural deformation (e.g., warping) of one or more of the most recently deposited elements to determine a new/revised set of structural deformation characteristics. Such warping may be quantified in terms of the magnitude of the displacement of vertices/nodes of the hexahedron shape of each element. In example embodiments, the structural deformation characteristics may be based at least in part on the determined thermal characteristics.

For example, a newly deposited element will generally be hotter and thus larger in dimensions than the originally determined hexahedron shape of the element for the final desired shape of the part. As the element cools, the shape of the element will generally become closer to the expected shape of the element specified in the original mesh. However, in some cases the shape of the element may not shrink to the expected hexahedron shape of the mesh after it has cooled or has not completely cooled. Thus the described structural deformation characteristics may quantify how much the shape of the element deviates from its original determined shape in the mesh. To capture these changes over time to the structural deformation of the elements as the part cools, a new/revised set of structural deformation characteristics may be determined with the simulated incremental deposit of each additional element.

In order to accurately simulate the impact of such structural deformations on the structure as the part is built up over time, one or more of the respective simulated newly deposited elements may be structurally modified prior to determining the thermal and structural deformation characteristics of the respective element so as to account for a volume change to the respective element resulting from structural deformation of a certain number of adjacent elements 146 determined from previously determined structural deformation characteristics. Thus, the processor 102 may be configured to modify the described mesh to change the volume (e.g., size/shape) of one or more of each newly deposited element based on the determined deformations of previously deposited adjacent elements 146.

In addition, the processor may be configured to determine stress characteristics 132 (e.g., Von Mises stress) across the part based on the determined thermal characteristics and/or structural deformation characteristics. Such stress characteristics may be determined after each deposit of an additional element in the simulation. Alternatively, stress characteristics may be made be determined after sets of elements (such as a layer) have been deposited in the simulation. Further, in alternative embodiments, stress characteristics may be determined after the simulation for the entire part is complete.

In example embodiments, the processor 102 may be configured to store data representative of the determined thermal characteristics 128, structural deformation characteristics 130, and/or stress characteristics to the data store 108. Since such data may be determined incrementally for each block, the data stored in the data store may include the corresponding determined thermal characteristics 128 and/or structural deformation characteristics 130, (and optional stress characteristics 132) for the respective shape (or portion thereof) of the part as each element is deposited for the simulation. In addition, the determined data for each incremental deposit may be associated with time data reflective of the time that the 3D-printer is simulated to have deposited the most recent element (or portion thereof).

In some example embodiments, the application software component may be configured to cause the display device 114 to display an animation of the simulation that highlights visually (via different colors, shading, dot density, dashed lines) the change over time in temperatures, deformation levels, and stress characteristics as each element is deposited for the simulation. The display device may further output quantitative data regarding the temperature, structural deformation, and/or stress characteristics calculated for each element at each incremental step in which an element is added to build up the part.

Based on such visual and/or quantitative data provided through the output device, a user may manually modify the 3D model of the part and/or the pattern of tool paths, in order to produce a second (i.e., different) set of tool paths that achieves less warping and/or stress characteristics in the finished part. However, it should also be appreciated that the application software component 106 may in some embodiments automatically produce a second set of tool paths 136, 140 and/or modify the CAD data 126 for the 3D model of the part, in order to attempt to produce the part with less warping and or stress characteristics. For such embodiments, based on at least one of the thermal characteristics 128, the structural deformation characteristics 130 and/or stress characteristics 132 determined for one or more of the elements 122, the at least one processor may be configured to at least one of select a second set of tool paths and/or generate a second set of tool paths usable to drive the 3D-printer to additively produce the part in a manner different than the first set of tool paths 110.

For example, the application software component may be operative to generate tool paths with different patterns such as a zigzag (back and forth) pattern, a spiral pattern (spiraling inwardly, or outwardly), and/or any other pattern, to build up each layer of a part. The visual representation 116 in FIG. 1 illustrates tool paths 120 that corresponds to a zigzag pattern. However, if such a pattern produces unacceptable thermal, structure deformation and/or stress characteristics, the application software component may be operative to select a different tool path scheme such as a spiral pattern to build up the part.

FIG. 1 illustrates an addition visual representation 138 of the simulation of the part being built up using a second set of tools paths 136 that correspond to a spiral pattern tool path scheme. This visual representation shows a schematic visual broken line representation 140 of an example portion of the second set of tool paths 136 (having the spiral pattern) that the laser 144 will follow to build up the simulated part 118 in order to form the same block shape produced via the first set of tool paths 110 (using a zigzag pattern).

The some examples, the application software component may be configured to carry out the simulations described herein for several of these different patterns in order to identify and select which set of tool paths produces optimal thermal, structural, and/or stress characteristics (relative to the other sets of tool paths tested; and/or relative to predetermined thresholds regarding thermal characteristics, structural characteristics, and/or stress characteristics). The determined optimal tool path, may then be stored in the data store and be subsequently accessed and used to instruct a 3D-printer to build a physical part. For example, the selected optimal tool path may be associated with a status and/or be saved in the data store, in a manner which indicates that it is usable to generate the part, whereas non-optimal tool paths may be deleted from the data store, and/or associated with a status indicative of their lower desirability relative to the selected tool path.

It should also be appreciated that the application software component may be configured to automatically alter selective portions of the first set of tool paths and/or the 3D model itself in order to produce the second set of tool paths that produces quantifiably better simulation results. Such selected portions may be determined from the particular elements in the simulation results that are associated with structural deformations and stress characteristics that are above predetermined thresholds.

Such changes may include changing an order in which portions of the elements are deposited. Such changes may also include adding additional structural supports to the 3D model of the part to stiffen portions of the part experiencing deformation. Such structural supports may include an internal rib or strut that remains a permanent member of the part. However, such structural supports may include a temporary external structural support that minimizes the structural deformation as the part is being produced, and which is intended to be cut away from the part after it is completed.

In another example, the application software component may be configured to determine from the simulation results that the thermal characteristics determined for at least one element has not sufficiently cooled (below a predetermined temperature threshold) via the time that the 3-D printer is determined to deposit at least one element adjacent thereto. Example embodiments may also be configured to identify from the simulation results when structural deformations and/or stress characteristics for a cooled part are above predetermined thresholds for one or more elements and/or the part as a whole.

To produce a part that avoids these issues, the application software component may be configured to use a different tool path scheme (compared to what was used to generate the first set of tool paths) in order to attempt to generate the second set of tool paths which produces quantitatively better simulation results for structural displacements and/or lower Von Mises stress.

For example, a second set of tool paths may be generated in which when a simulation is carried out, all of the elements sufficiently cool by the time a subsequent element is determined to be deposited adjacent thereto. In another example, the second set of tool paths may be generated in which when a simulation is carried out, the structural deformations and/or stress characteristics are lower than predetermined thresholds and/or are relatively lower than those determined for the first set of tool paths.

The following is an example in which the previously described simulations may be carried out in order to produce quantitative data usable to optimize tool paths for producing a part with a 3D-printer. In this example, the application software component may correspond to a CAM component and may be configured to obtain from the CAM environment the CAD 3D model of the part to be manufactured, the additive manufacturing parameters defined on it, including the instructions for tool path positions (e.g., GCode), and environmental conditions (e.g., thermal characteristics of the environment such as for the base plate or other structure in which the part is being deposited).

From the 3D model, the application software component may be configured to compute a bounding box of the part. For SLS type 3D-printers, the bounding box may correspond to the volume of the powder bed. Also, an inflated bounding box may be computed with respect to the actual size of the part, to simulate the presence of overhangs in the tool path.

In this example, the application software component may generate a Cartesian hexahedral mesh of the bounding box. In alternative embodiments a tetrahedral mesh may be used. It should be noted that the use of a structured Cartesian hexahedral grid, versus a tetrahedral grid, may allow for relatively faster browsing of the mesh during the execution, to identify elements touched by the tool path and to identify adjacencies in the laser movement direction or in the underlying layers.

Next the application software component may browse the mesh and identify an order of elements deposition, based on the tool path positions. To perform this function, the original tool path generated from the 3D model of the part (as a GCode file for example) may be interpolated to obtain the intermediate positions between each couple of consecutive "go to" instructions. This may be performed using a bisection algorithm that proceeds by looking for a point that falls inside existing elements (e.g., for linear paths), or by using additional information about the path shape (e.g., for circular paths).

This example simulation may include simulating the depositing of single elements on the build plate and on previously deposited elements after having checked and compensated for a potential initial volume change of the element caused by deformation of the underlying element(s). Such compensation in volume for an element may be carried out by changing some of the coordinates in the mesh for the hexahedron that defines the position and size of the element.

As noted previously, the simulation is carried out incrementally for each additional deposit of an element, which also corresponds to movement of the laser of the 3D-printer for example to a position adjacent the current element to deposit. Thus, for each incremental step in which an element is being deposited, the application software component may update the boundary conditions for a transient thermal simulation based on the change in the geometry of the mesh and the change in laser position.

The application software component may then compute the input to run the transient thermal simulation, and perform the thermal simulation of the geometry deposited so far (with the current element being the most recently deposited element), with a heat flux prescribed on the top surface of the current element to deposit, and a known temperature at the contact with the build plate (or other structure).

Next, the application software component may update the boundary conditions for a structural deformation simulation based on the change in the geometry of the mesh and the change in determined thermal changes to the part so far.

In addition, the application software component may compute the input to run the structural simulation, and perform the structural simulation of the geometry deposited so far, including warping, and with a temperature load defined by the result of the transient thermal simulation for the current element being deposited. It should also be noted that example embodiments may optionally iterate between thermal and structural simulations for the same geometry, to achieve convergence to the solution of the fully-coupled thermo-structural problem.

For each element that is simulated to be deposited, the output variables determined by the application software component may include temperature, displacement and stress values for each element, sets of elements, and/or the whole part.

As discussed previously, the volume of a currently deposited element in the mesh may be updated to compensate for changes to the position of underlying or laterally adjacent elements previously deposited. For example, during the additive manufacturing process, the volume of the deposited elements, changes in time, due to the effect of temperature gradient on the structural deformation of the part. As a consequence, if the initial configuration of the hexahedral mesh is utilized to identify the coordinate of the new element to "deposit" to the existing mesh, when the laser reaches that position, overlaps between the element to deposit and the previously deposited and deformed elements might occur. On the other hand, by simply adjusting the overlapping nodes of the new element, in order to make them coincide with the deformed ones, would cause a non-realistic change in the material volume added to the solid part in the next laser position. Hence, example embodiments are configured to modify the mesh to reflect a new volume for the element intended to be currently deposited on previously deposited elements.

To carry out updating the mesh in this manner, before each new element is deposited, the deformation that has been computed (as described previously) for the deposited elements is applied to the nodes of the new element that are shared with the deposited ones. The volume of the resulting new element is computed, and if it deviates from the volume of an undeformed element, several additional operations are performed.

These operations include the application software component identifying faces and their corresponding nodes of the new element that are not shared with a deposited element as being "free" (i.e., available to be adjusted). The other faces are considered fixed and will not be adjusted by this procedure.

The displacement of the free nodes may be computed by the application software component such that the volume of the deposited element is equal to its volume in the undeformed configuration, by solving the following equation:

$$6v_{LD} = \begin{vmatrix} x_6 - & y_6 - & z_6 - \\ x_0 & y_0 & z_0 \\ x_1 - & y_1 - & z_1 - \\ x_0 & y_0 & z_0 \\ x_5 - & y_5 - & z_5 - \\ x_2 & y_2 & z_2 \end{vmatrix} + \begin{vmatrix} x_6 - & y_6 - & z_6 - \\ x_0 & y_0 & z_0 \\ x_3 - & y_3 - & z_3 - \\ x_0 & y_0 & z_0 \\ x_2 - & y_2 - & z_2 - \\ x_7 & y_7 & z_7 \end{vmatrix} + \begin{vmatrix} x_6 - & y_6 - & z_6 - \\ x_0 & y_0 & z_0 \\ x_4 - & y_4 - & z_4 - \\ x_0 & y_0 & z_0 \\ x_7 - & y_7 - & z_7 - \\ x_5 & y_5 & z_5 \end{vmatrix}$$

for the displacement variables $(x_i, y_i, z_i)$, which are populated via rules described in more detail below. This deformation may be applied to the new element, before any simulation takes place involving this element, in order to adjust its volume to a user-defined parameter representing the melt pool size $(v_{LD})$.

The new adjusted element is added to the mesh, and the transient thermal and structural simulations are performed on the whole or part of the geometry deposited so far (including the current element with the adjusted volume).

This described algorithm takes as input the coordinates of the 8 vertices (i.e., nodes) of a hexahedron and information on which of these vertices cannot be moved, because they belong to the part of the mesh that has been already deposited and simulated. For a DED type of 3D-printer, adjustment may be made to the free vertices in the build direction. However, for the free vertices with an SLS 3D-printer, no adjustment movement may be possible in the build direction. This is because even though a neighbor element as deformed, occupies some of the volume originally planned for the current element, the top level of the powder in the SLS process does not get adjusted because of this and remains at the original planned level (e.g., height in the reference frame of the simulation). On the other hand, the heat from the laser can diffuse in the plane orthogonal to the build direction, melting the surrounding powder and increasing the volume of an element in lateral directions.

In these described examples, the displacement in the applicable free directions for vertexes may be chosen to be the same so as to fix the required degrees of freedom in the formulation and obtain a realistic deformation pattern. Once the adjustment to the free vertices has been calculated, the mesh may be updated, and the previously described transient thermal and structural deformation simulations may be carried out based on the updated mesh.

To obtain the solution to the problem of finding the displacement for the free vertices that satisfy the required volume constraint, the above-referenced equation is solved for the unknown coordinates. However, depending on the number of free vertices and on which ones they are, different $3^{rd}$ order equations may need to be solved.

In example embodiments, to efficiently find the displacements for the free vertices, the above equation may be unrolled into a sum of 144 terms and saved in separate variables that can be evaluated. Every time a new set of unknown/known coordinates is received for an element, the application software component may be configured to translate the element to have a 0 barycenter (and the original barycenter is saved). All of the 144 terms may then be computed giving a value 1 to the known coordinates and value 2 to the unknown coordinates. The 144 terms may then be classified based on their value: terms with value 8 represent $3^{rd}$ order terms, terms with value 4 represent $2^{nd}$ order terms, terms with value 2 represent $1^{st}$ order terms, and terms with value 0 represent known terms.

The 144 terms may then be re-evaluated using the original coordinate values for the known/fixed coordinates and using 1 or −1 for the unknowns, following these rules: +1 is assigned to coordinate j of vertex i if a symmetric expansion of the volume would cause coordinate j of vertex i to increase its value; −1 is assigned to coordinate j of vertex i if a symmetric expansion of the volume would cause coordinate j of vertex i to decrease its value.

Based on the previously determined classifications of the 144 terms, the terms are summed to form a $1^{st}$ order coefficient, a $2^{nd}$ order coefficient, a $3^{rd}$ order coefficient and a known term. In addition, the term 6*target_volume is subtracted from the known term. Depending on the highest order coefficient which is non-zero, an applicable formula is called to resolve the equation. The obtained displacement is then applied to all the unknowns and the element is translated back to its original barycenter, in order to produce a modified volume for the element and a correspondingly updated mesh.

For the previously described simulations, the application software component may be configured to determine a plurality of boundary and initial conditions for use with carrying out the simulations. For the transient thermal simulation carried out for an SLS 3D-printer, for each new element that is deposited, if any of the nodes of an element lay on the base plate, the initial temperature of the powder may be initialized at a value corresponding to a plate pre-heating temperature. Such a plate pre-heating temperature may be a user configurable setting provided via a GUI of the application software component. For other structures that serve as a base, the temperature of the powder may be initialized to an environment temperature (which may be specified by the user via the GUI).

On the top surface of each newly deposited element, a heat flux may be computed by the application software component. This computation may include a value of laser power obtained as an input (e.g., via the GUI), which is divided by surface area, and the time of heat flux application may be computed based by dividing the length of the distance traversed by the tool on that element (represented by the width of laser beam parameter) and the feed rate (also obtained as input via the GUI). On the external surface of the deposited model (excluding base surface and top of currently heated element), a convection condition is applied. To apply such a condition, the list of external surfaces, that is all surfaces of deposited elements that are not in contact with other deposited elements, a dynamic list of faces may be maintained and adjusted during the deposition.

While a more realistic simulation may account for the presence of the unmelted powder on a portion of this surface, simulating the whole powder block would increase considerably the computational time. The simplification provided in this example for the transient thermal simulation still accounts for heat exchange through the non-heated surfaces while not increasing the computational cost. The application software component may enable the user to input the desired convection coefficient and by tuning this value, a realistic representation of the conduction boundary condition can be achieved.

For the structural deformation simulation carried out for an SLS 3D-printer, to have a well-posed structural model, the first 2 bottom nodes of the first deposited element may be fully constrained. All other nodes of the bottom surface may be constrained to allow their movement in the plane of deposition only. In terms of loads, gravity may be applied to the simulation, in addition to the temperature field obtained from the transient thermal simulation on the same geometry, with the conditions specified above. In example embodiments, these described conditions and the elements/nodes/surfaces to which they apply, may be computed after each element is deposited and used as input to the thermal and structural simulations.

As discussed previously, above the thermal and structural simulations may include several different inputs that are provided by the user via in input device (via a GUI) and/or determined from the data store or other source of parameters. Such inputs that may be used to perform the described simulations may include the previously described tool path positions (e.g., "go to" instructions) and the type of motion of the laser (linear, curved), which are used to compute the interpolated tool path and identify the elements to be deposited at each step of the simulation. In addition, such inputs may include the previously described 3D model of the solid body geometry of the part, which is used to generate a bounding box of the part to be manufactured. Also, as described previously, example embodiments may determine the tool paths positions and type of motion based on the 3D model of the part.

In addition, such inputs may include 3D-printer parameters such as a laser beam diameters/width, which is used to set the element dimension in the plane orthogonal to the build orientation, as well as the layer thickness which is used to set the element dimension in the build orientation direction. Based on these inputs which provide dimension for the described elements, and based on the bounding box determined from the 3D model of the part, the previously described hexahedral mesh may be determined.

Additional 3D-printer parameters that serve as inputs for the described simulation may include feed rate and laser power. The laser beam width and the feed rate inputs may be used to compute the time spent by the laser on a top surface of a given element. The computed surface time and the laser power input may then be used to compute the heat flux to be applied on top of a given element, by dividing the power by the surface of application. Since some simulations may not automatically account for the latent heat needed by the material for phase changes, the heat flux may be calculated based on the net heat after the phase change has occurred.

As discussed previously, inputs may also include environmental (ambient) temperature and the convection coefficient, which may be used to determine the convection boundary conditions. Further, the inputs may include the base plate temperature to which the bottom of the simulated part is initialized to in order to the start the thermal simulation. In addition, inputs may include material properties which impact the thermal and structural simulations.

Figure 2:
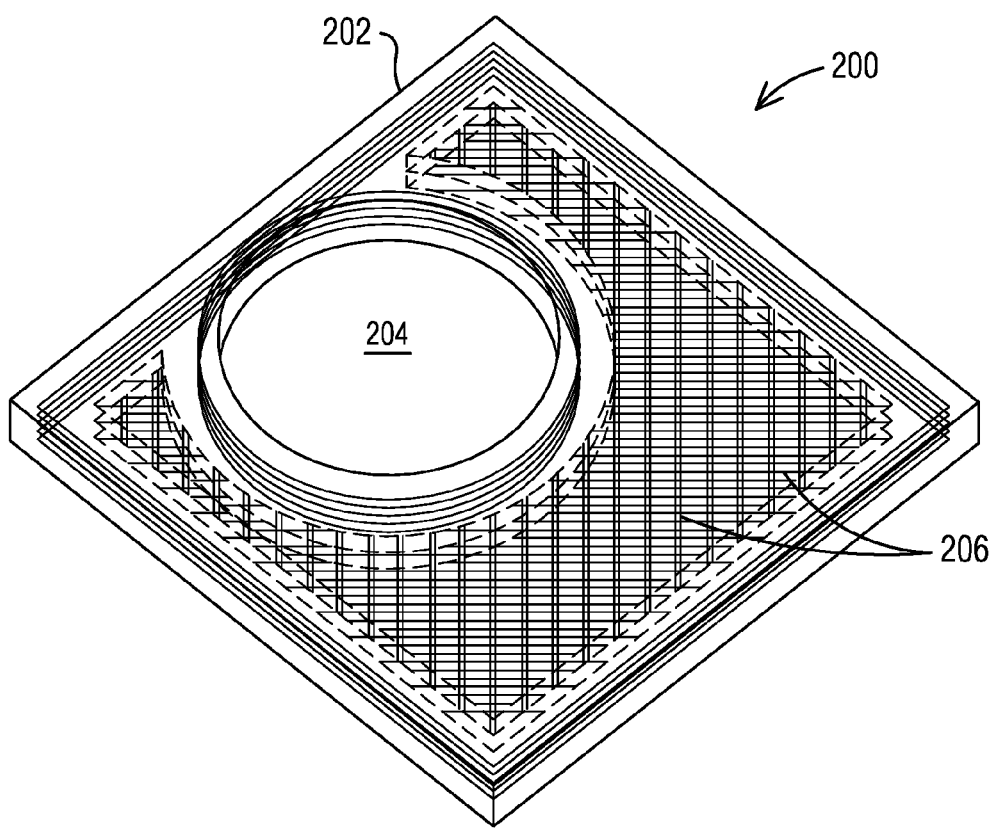
FIG. 2 illustrates an example geometry of a part with a cylindrical hole showing example tool paths for a 3D-printer to follow when building up a part.

FIG. 2 illustrates example geometry 200 of a block 202 with a cylindrical hole 204 through it, in which the previously described simulations may be carried out. FIG. 2 also illustrates an example set of tool paths 206 that may be determined from the example geometry in order to create instructions (such as GCode) usable to drive a 3D-printer to produce the physical block. As described previously, such tool paths are used to determine the order that elements of a hexahedral mesh of the part may be simulated to be deposited in order to build up the part.

FIGS. 3-6 illustrate graphically such simulations. As discussed previously, the application software component may be configured to cause a display device to output images and/or animations corresponding to the incremental changes to the thermal, structural, and stress characteristics illustrated in these figures.

Figure 3:
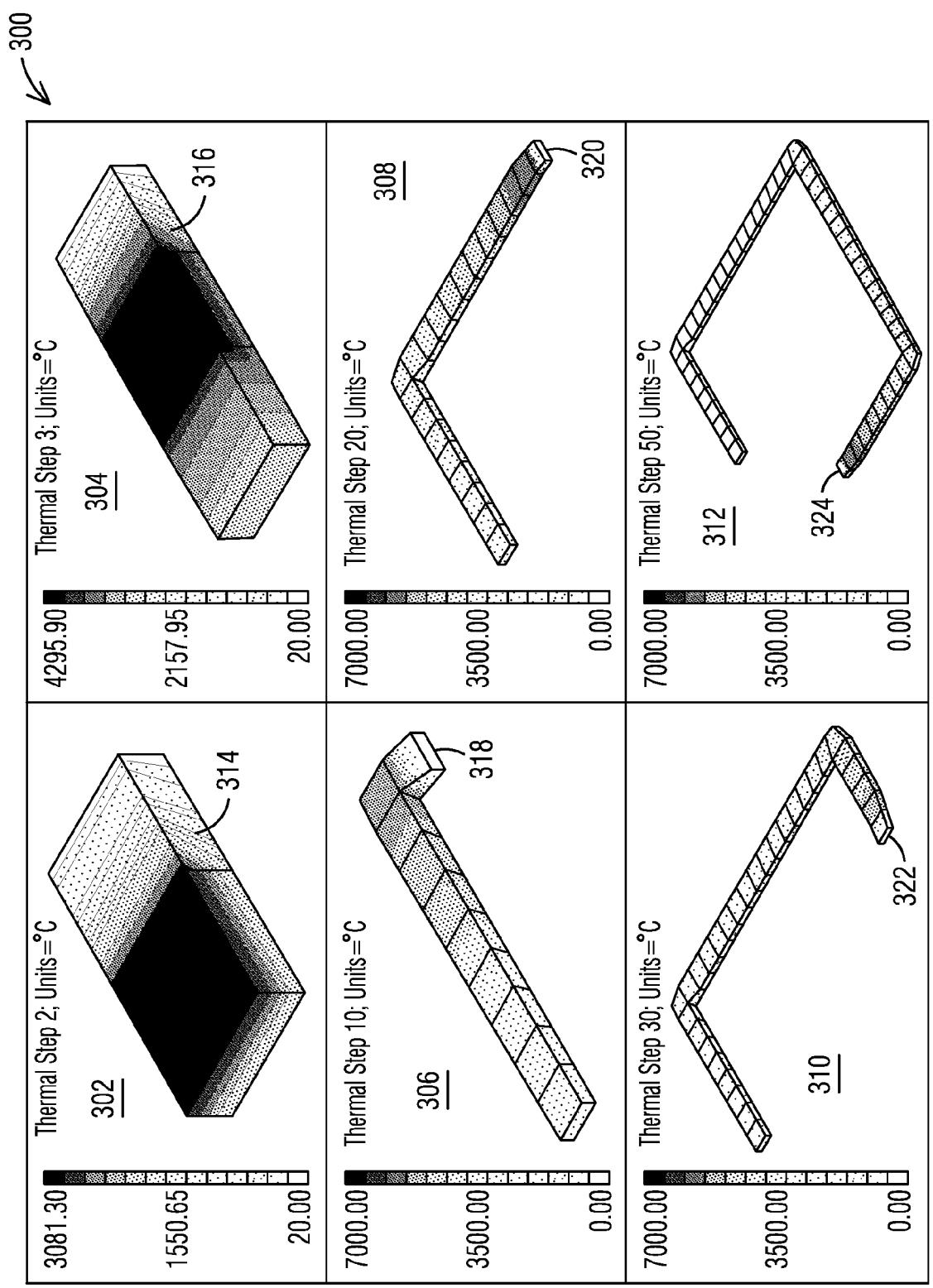
FIG. 3 illustrates graphical images of determined temperature characteristics for different time points of a simulation of elements being deposited to build up the part.

For example, FIG. 3 shows determined temperature characteristics 300 in terms of a temperature map (in degrees Celsius) across the elements for different time points 302, 304, 306, 308, 310, 312 of the simulation, while the first layer of elements is deposited. Elements 314, 316, 318, 320, 322, 324 correspond to the most recently deposited element in each respective time point. In these images, white areas depict the lowest temperatures, while progressively darker areas indicate progressively higher temperatures.

Figure 4:
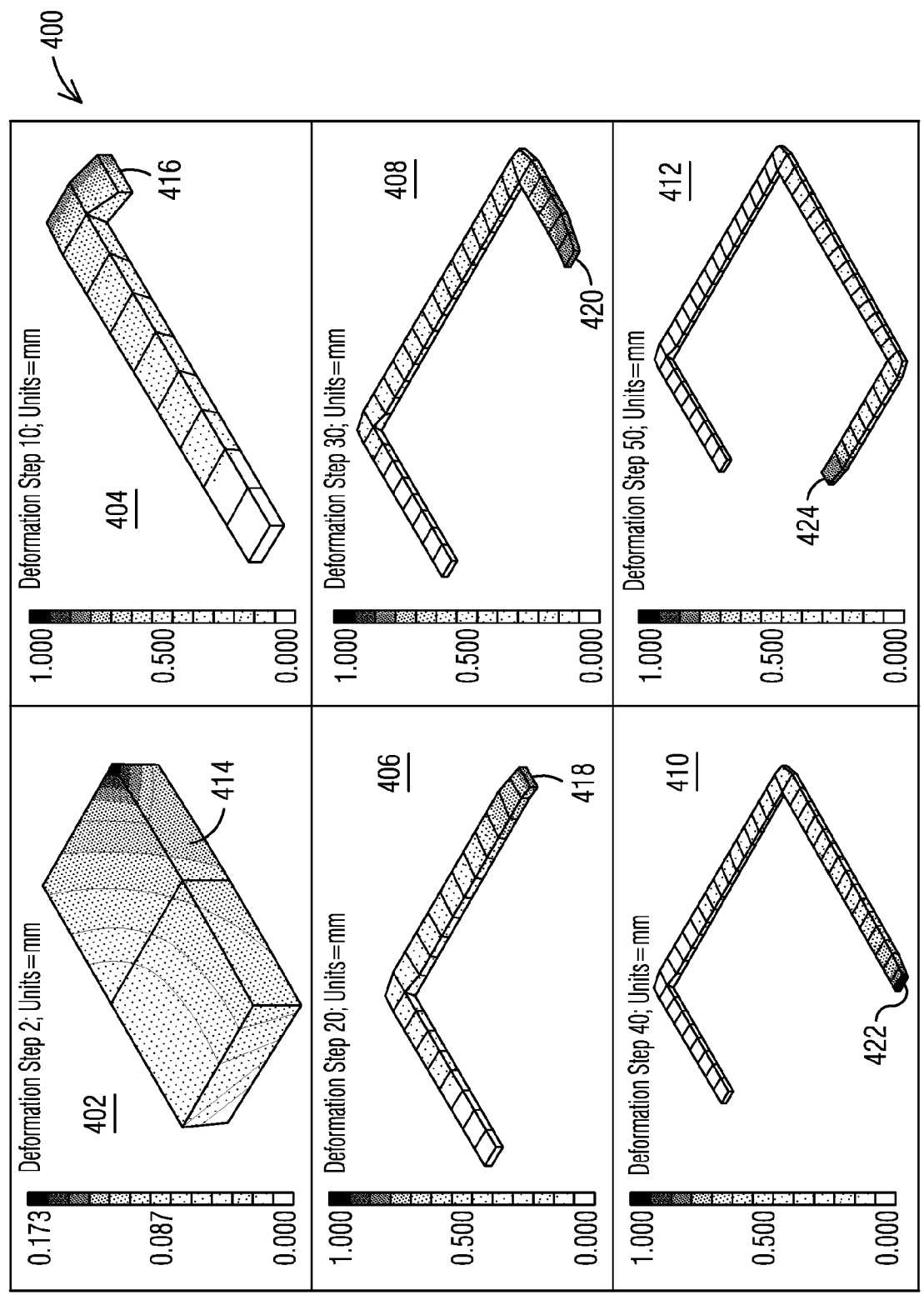
FIG. 4 illustrates graphical images of determined structural deformation characteristics for different time points of a simulation of elements being deposited to build up the part.
Figure 5:
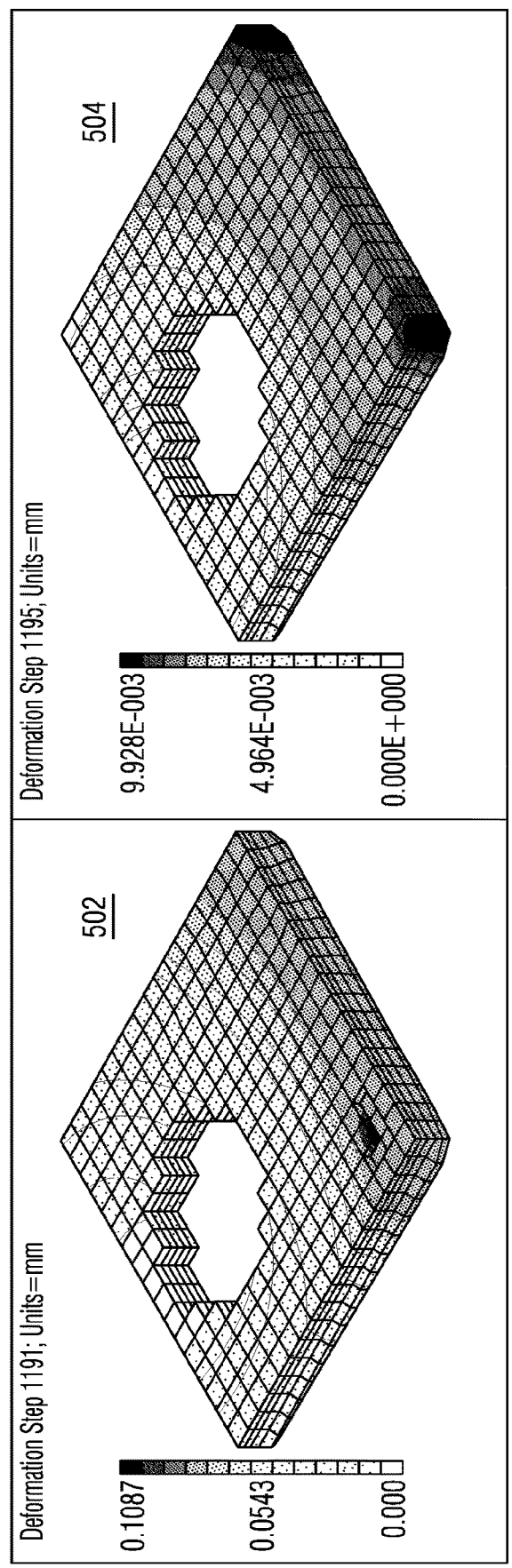
FIG. 5 illustrates graphical images of structural deformation characteristics towards the end of the simulation at two different time points.
Figure 6:
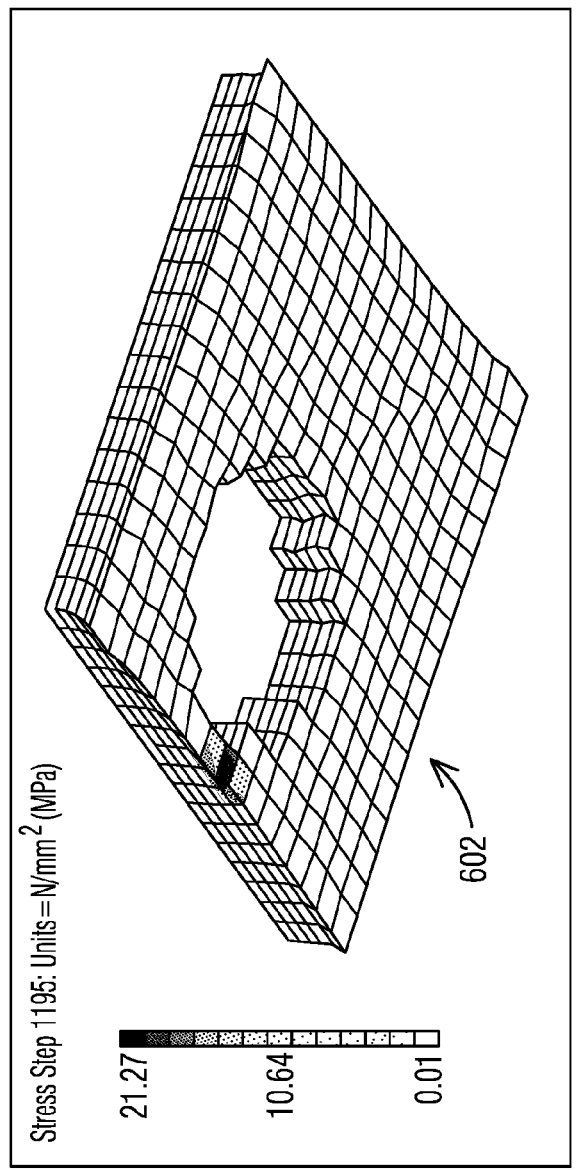
FIG. 6 illustrates a graphical image of determined stress characteristics for the elements that comprise the final part produced by the simulation.

FIG. 4 shows determined structural deformation characteristics 400 in terms of the magnitude of nodal displacement (in millimeters) for the nodes/vertices of the deposited hexahedron elements at the different time points 402, 404, 406, 408, 410, 412. Elements 414, 416, 418, 420, 422, 424 correspond to the most recently deposited element in each respective time point. FIG. 5 shows structural deformation characteristics 500 in terms of nodal displacement (in millimeters) towards the end of the simulation of the material build up for the part at two different time points 502, 504. In these images in FIGS. 4 and 5, white areas depict no displacement or the least amount of displacement (of nodes) of elements from the original shape of the mesh for the type of the material being used, while progressively darker areas indicate progressively larger displacements (of nodes) from the original shape of the element defined by the mesh of the desired part. Thus in these examples, the most recently deposited elements are shown with larger magnitudes of displacement of their nodes because these elements have not yet cooled to their expected cooled hexahedron shape Also, FIG. 6 shows an example of determined stress characteristics 600 (e.g., Von Mises stress in MPa) for the elements that comprise the final part produced by the simulation, from an isometric view that shows the bottom 602 of the part. In this example, white areas depict the lowest Von Mises stress, while progressively darker areas indicate progressively larger Von Mises stress.

Figure 7:
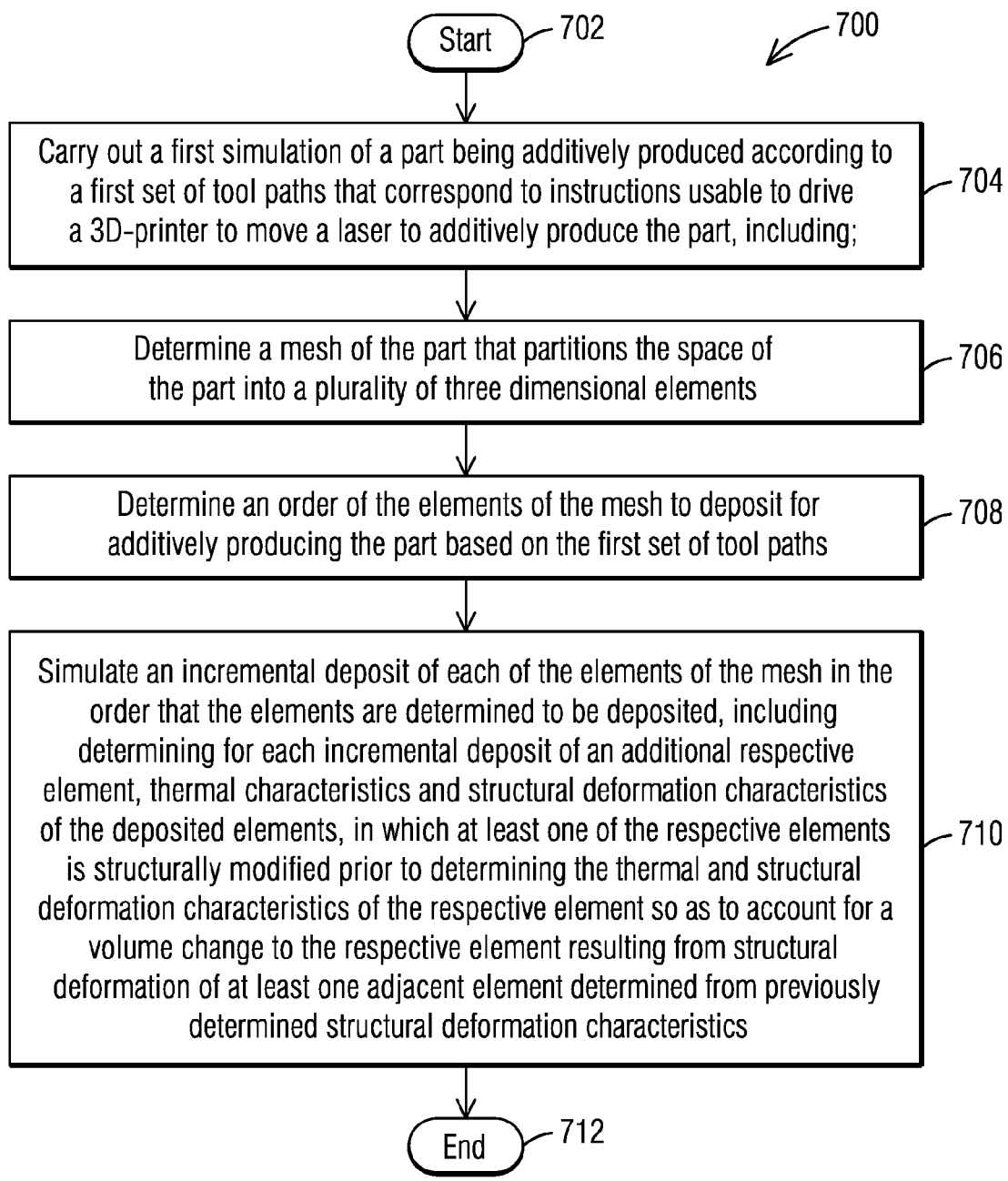
FIG. 7 illustrates a flow diagram of an example methodology that facilitates optimizing tool paths of a laser of a 3D-printer based on thermal/structural simulations of a part being produced via the 3D-printer.

With reference now to FIG. 7, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Referring now to FIG. 7, a methodology 700 that facilitates optimizing tool paths of a laser of a 3D-printer based on thermal/structural simulations of a part being produced via the 3D-printer. The method may start at 702 and the methodology may include several acts carried out through operation of at least one processor.

These acts may include an act 704 of through operation of at least one processor, carrying out a first simulation of a part being additively produced according to a first set of tool paths that correspond to instructions usable to drive a 3D-printer to move a laser to additively produce the part. Such a first simulation may include acts such as an act 706 of determining a mesh of the part that partitions the space of the part into a plurality of three dimensional (3D) elements. In addition, the first simulation may include an act 708 of determining an order of the elements of the mesh to deposit for additively producing the part based on the first set of tool paths. In addition, the first simulation may include an act 710 of simulating an incremental deposit of each of the elements of the mesh in the order that the elements are determined to be deposited, including determining for each incremental deposit of an additional respective element, thermal characteristics and structural deformation characteristics of the deposited elements. For act 710, at least one of the respective elements may be structurally modified prior to determining the thermal and structural deformation characteristics of the respective element so as to account for a volume change to the respective element resulting from structural deformation of at least one adjacent element determined from previously determined structural deformation characteristics. At 712 the methodology may end.

It should be appreciated that the methodology 700 may include other acts and features discussed previously with respect to the processing system 100. For example, the mesh may correspond to a hexahedral mesh comprised of the elements that are hexahedrons. Further, the methodology may comprise through operation of the at least one processor: an act of determining element dimensions based on data corresponding to a laser width and a layer thickness for the 3D-printer; and an act of receiving CAD data defining a 3D model of the part. As discussed previously, the mesh may be determined based on the determined element dimensions and the 3D model of the part. Also the order that the elements are deposited may be determined based on a determination as to which elements of the mesh intersect with the laser beam of the laser of the 3D-printer as the 3D-printer operates to deposit material onto the part based on the first set of tool paths.

As discussed previously, the determined thermal characteristics include data that specifies temperature changes of deposited elements. Also the determined structural deformation characteristics include data that specifies structural changes (i.e., changes in shape) of deposited elements that is determined based at least in part on the data that specifies temperature changes of the deposited elements. Also, the methodology may further comprise determining stress characteristics associated with all or a portion of the part based at least in part on at least one of the thermal characteristics or the structural deformation characteristics or a combination thereof.

In some example embodiments, the methodology may include causing a display device to output a visual animation that depicts each element being sequentially deposited to build up the part, wherein the animation includes at least a portion of the elements visually changing with each respective deposit of an element based on the thermal characteristics or the structural deformation characteristics determined for each respective deposit of an element.

Further, in some example embodiments, the methodology may include based on at least one of the thermal characteristics, the structural deformation characteristics, the stress characteristics or a combination thereof determined for one or more of the respective elements, at least one of selecting a second set of tool paths, generating the second set of tool paths, or a combination thereof. In this example, the second set of tool paths is also usable to drive the 3D-printer to additively produce the part and is different than the first set of tool paths.

Also, in some example embodiments, the methodology may include carrying out a second simulation of the part being additively produced according to the second set of tool paths. Such a second simulation may include acts such as determining a revised order of the elements of the mesh to deposit for additively producing the part based on the second set of tool paths. Also the second simulation may include simulating an incremental deposit of each of the elements of the mesh in the revised order that the elements are determined to be deposited, including determining for each incremental deposit of an additional respective element, further thermal characteristics and further structural deformation characteristics of the deposited elements. For this act, at least one of the respective elements is structurally modified prior to determining the further thermal and structural deformation characteristics of the respective element so as to account for a volume change to the respective element resulting from structural deformation of at least one adjacent element determined from previously determined further structural deformation characteristics.

In this example, the methodology may also include determining further stress characteristics associated with all or a portion of the part based at least in part on at least one of the further thermal characteristics, the further structural deformation characteristics or a combination thereof. Also this example may include an act of selecting which of the first and second sets of tool paths to use to produce the part with the 3D-printer based on at least one of: the thermal characteristics; the further thermal characteristics; the structural deformation characteristics; the further structural deformation characteristics; the stress characteristic; the further stress characteristics; or a combination thereof for the first and second simulations.

In addition, example embodiments of the described methodology may include generating instructions corresponding the first set of tool paths or the second set of tool that are usable to drive the operation of the 3D-printer to additively manufacture the part. The 3D-printer may then carry out an act of producing the part using a configuration of the 3D-printer based on the instructions corresponding to the first set of tool paths or the second set of tool paths.

As discussed previously, acts associated with these methodologies (other than any described manual acts) may be carried out by one or more processors. Such processor(s) may be included in one or more data processing systems, for example, that execute software components (such as the described application software component) operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software environments/languages/frameworks such as Java, JavaScript, Python, C, C#, C++ or any other software tool capable of producing components and graphical user interfaces configured to carry out the acts and features described herein.

Figure 8:
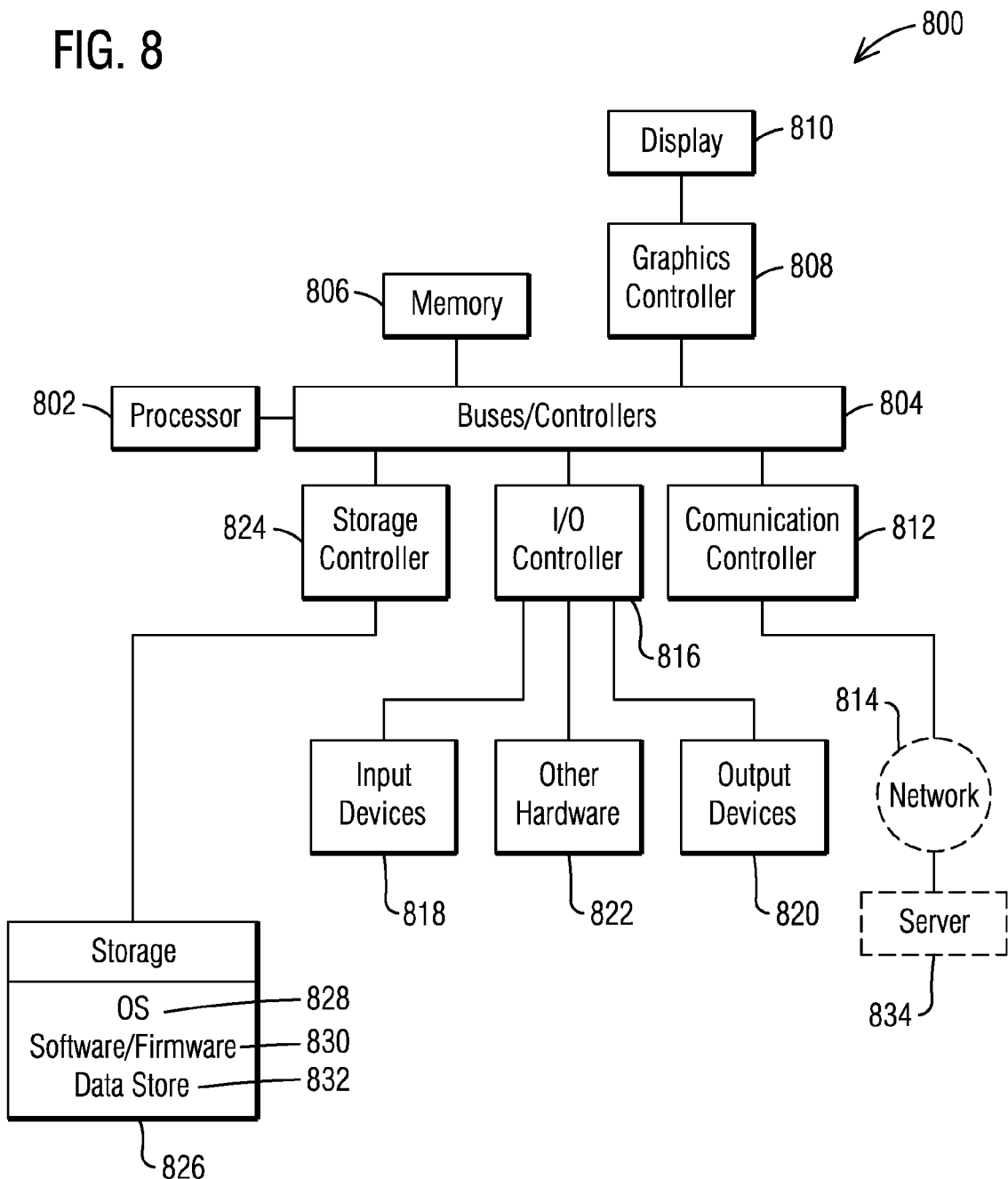
FIG. 8 illustrates a block diagram of a data processing system in which an embodiment may be implemented.

FIG. 8 illustrates a block diagram of a data processing system 800 (also referred to as a computer system) in which an embodiment can be implemented, for example, as a portion of a product system, and/or other system operatively configured by software or otherwise to perform the processes as described herein. The data processing system depicted includes at least one processor 802 (e.g., a CPU) that may be connected to one or more bridges/controllers/buses 804 (e.g., a north bridge, a south bridge). One of the buses 804, for example, may include one or more I/O buses such as a PCI Express bus. Also connected to various buses in the depicted example may include a main memory 806 (RAM) and a graphics controller 808. The graphics controller 808 may be connected to one or more display devices 810. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 812 (Ethernet controllers, WiFi controllers, cellular controllers) operative to connect to a local area network (LAN), Wide Area Network (WAN), a cellular network, and/or other wired or wireless networks 814 or communication equipment.

Further components connected to various busses may include one or more I/O controllers 816 such as USB controllers, Bluetooth controllers, and/or dedicated audio controllers (connected to speakers and/or microphones). It should also be appreciated that various peripherals may be connected to the I/O controller(s) (via various ports and connections) including input devices 818 (e.g., keyboard, mouse, pointer, touch screen, touch pad, drawing tablet, trackball, buttons, keypad, game controller, gamepad, camera, microphone, scanners, motion sensing devices that capture motion gestures), output devices 820 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 802 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 822 connected to the I/O controllers 816 may include any type of device, machine, or component that is configured to communicate with a data processing system.

Additional components connected to various busses may include one or more storage controllers 824 (e.g., SATA). A storage controller may be connected to a storage device 826 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 804 such as a PCI Express bus.

A data processing system in accordance with an embodiment of the present disclosure may include an operating system 828, software/firmware 830, and data stores 832 (that may be stored on a storage device 826 and/or the memory 806). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 812 may be connected to the network 814 (not a part of data processing system 800), which can be any public or private data processing system network or combination of networks, as known to those of skill in the art, including the Internet. Data processing system 800 can communicate over the network 814 with one or more other data processing systems such as a server 834 (also not part of the data processing system 800). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 802 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 800 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 800 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

This application claims priority to U.S. Provisional App. No. 62/247,241, filed Oct. 28, 2015, which is hereby incorporated herein by reference in its entirety.

What is claimed is:

1. A system comprising:
at least one processor configured to:
carry out a first simulation of a part being additively produced according to a first set of tool paths that correspond to instructions usable to drive a 3D-printer to move a laser to additively produce the part, wherein the at least one processor is configured to, in carrying out the first simulation of the part:
determine a mesh of the part that partitions the space of the part into a plurality of three dimensional (3D) elements;
determine an order of the elements of the mesh to deposit for additively producing the part based on the first set of tool paths;
simulate an incremental deposit of each of the elements of the mesh in the order that the elements are determined to be deposited, wherein for each incremental deposit of an additional respective element the at least one processor determines thermal characteristics and structural deformation characteristics of the deposited elements, in which at least one of the respective elements is structurally modified prior to determining the thermal and structural deformation characteristics of the respective element so as to account for a volume change to the respective element resulting from structural deformation of at least one adjacent element determined from previously determined structural deformation characteristics; and
select, from among the first set of tool paths and a second set of tool paths, to use to produce the part through the 3D-printer based on the first simulation of the part being additively produced according to the first set of tool paths.

2. The system according to claim 1, wherein the mesh corresponds to a hexahedral mesh comprised of the elements that are hexahedrons, wherein the at least one processor is configured to determine element dimensions based on data corresponding to a laser width and a layer thickness for the 3D-printer, wherein the at least one processor is configured to receive computer-aided design (CAD) data defining a 3D model of the part, wherein the at least one processor is configured to determine the mesh based on the determined element dimensions and the 3D model of the part, wherein the at least one processor is configured to determine the order that the elements are deposited based on a determination as to which elements of the mesh intersect with a laser beam of the laser of the 3D-printer as the 3D-printer operates to deposit material onto the part based on the first set of tool paths.

3. The system according to claim 1, wherein the determined thermal characteristics include data that specifies temperature changes of deposited elements, wherein the determined structural deformation characteristics include data that specifies structural changes of deposited elements determined based at least in part on the data that specifies temperature changes of the deposited elements, wherein the at least one processor is configured to determine stress characteristics associated with all or a portion of the part based at least in part on at least one of the thermal characteristics, the structural deformation characteristics, or a combination thereof.

4. The system according to claim 3, wherein based on at least one of the thermal characteristics, the structural deformation characteristics, stress characteristics or a combination thereof determined for one or more of the respective elements, the at least one processor is configured to at least one of select the second set of tool paths, generate the second set of tool paths, or a combination thereof, wherein the second set of tool paths is usable to drive the 3D-printer to additively produce the part and wherein the second set of tool paths is different than the first set of tool paths.

5. The system according to claim 1, further comprising a display device, wherein the at least one processor is configured to cause the display device to output a visual animation that depicts each element being sequentially deposited to build up the part, wherein the animation includes at least a portion of the elements visually changing with each respective deposit of an element based on the thermal characteristics or the structural deformation characteristics determined for each respective deposit of an element.

6. The system according to claim 1, wherein the at least one processor is further configured to carry out a second simulation of the part being additively produced according to the second set of tool paths, in which the at least one processor is configured to, in carrying out the second simulation of the part:
determine a revised order of the elements of the mesh to deposit for additively producing the part based on the second set of tool paths;
simulate an incremental deposit of each of the elements of the mesh in the revised order that the elements are determined to be deposited, wherein for each incremental deposit of an additional respective element the at least one processor determines further thermal characteristics and further structural deformation characteristics of the deposited elements, in which at least one of the respective elements is structurally modified prior to determining the further thermal and structural deformation characteristics of the respective element so as to account for a volume change to the respective element resulting from structural deformation of at least one adjacent element determined from previously determined further structural deformation characteristics;
determine further stress characteristics associated with all or a portion of the part based at least in part on at least one of the further thermal characteristics, the further structural deformation characteristics or a combination thereof,
wherein the at least one processor is configured to select which of the first and second sets of tool paths to use to produce the part with the 3D-printer based on at least one of: the thermal characteristics; the further thermal characteristics; the structural deformation characteristics; the further structural deformation characteristics; the stress characteristic; the further stress characteristics; or a combination thereof for the first and second simulations.

7. The system according to claim 1, further comprising the 3D-printer, wherein the at least one processor is configured to store instructions corresponding the first set of tool paths or the second set of tool paths to at least one data store, wherein the instructions are usable to drive the operation of the 3D-printer to additively manufacture the part.

8. A method comprising:
through operation of at least one processor, carrying out a first simulation of a part being additively produced according to a first set of tool paths that correspond to instructions usable to drive a 3D-printer to move a laser to additively produce the part, including by:
determining a mesh of the part that partitions the space of the part into a plurality of three dimensional (3D) elements;
determining an order of the elements of the mesh to deposit for additively producing the part based on the first set of tool paths;
simulating an incremental deposit of each of the elements of the mesh in the order that the elements are determined to be deposited, including determining for each incremental deposit of an additional respective element, thermal characteristics and structural deformation characteristics of the deposited elements, in which at least one of the respective elements is structurally modified prior to determining the thermal and structural deformation characteristics of the respective element so as to account for a volume change to the respective element resulting from structural deformation of at least one adjacent element determined from previously determined structural deformation characteristics; and
selecting, from among the first set of tool paths and a second set of tool paths, to use to produce the part through the 3D-printer based on the first simulation of the part being additively produced according to the first set of tool paths.

9. The method according to claim 8, wherein the mesh corresponds to a hexahedral mesh comprised of the elements that are hexahedrons, further comprising through operation of the at least one processor:
determining element dimensions based on data corresponding to a laser width and a layer thickness for the 3D-printer; and
receiving computer-aided design (CAD) data defining a 3D model of the part,
wherein the mesh is determined based on the determined element dimensions and the 3D model of the part, wherein the order that the elements are deposited is determined based on a determination as to which elements of the mesh intersect with a laser beam of the laser of the 3D-printer as the 3D-printer operates to deposit material onto the part based on the first set of tool paths.

10. The method according to claim 8, wherein the determined thermal characteristics include data that specifies temperature changes of deposited elements, wherein the determined structural deformation characteristics include data that specifies structural changes of deposited elements determined based at least in part on the data that specifies temperature changes of the deposited elements, further comprising:
determining stress characteristics associated with all or a portion of the part based at least in part on at least one of the thermal characteristics, the structural deformation characteristics, or a combination thereof.

11. The method according to claim 10, further comprising:
based on at least one of the thermal characteristics, the structural deformation characteristics, stress characteristics or a combination thereof determined for one or more of the respective elements, at least one of selecting the second set of tool paths, generating the second set of tool paths, or a combination thereof, wherein the second set of tool paths is usable to drive the 3D-printer to additively produce the part and wherein the second set of tool paths is different than the first set of tool paths.

12. The method according to claim 11, further comprising:
through operation of the at least one processor, generating instructions corresponding to the first set of tool paths or the second set of tool paths of which was selected to produce the part through the 3D printer and that are usable to drive the operation of the 3D-printer to additively manufacture the part; and
through operation of the 3D-printer, producing the part using a configuration of the 3D-printer based on the instructions corresponding the first set of tool paths or the second set of tool paths.

13. The method according to claim 8, further comprising through operation of the at least one processor:
causing a display device to output a visual animation that depicts each element being sequentially deposited to build up the part, wherein the animation includes at least a portion of the elements visually changing with each respective deposit of an element based on the thermal characteristics or the structural deformation characteristics determined for each respective deposit of an element.

14. The method according to claim 8, further comprising through operation of the at least one processor:
carrying out a second simulation of the part being additively produced according to the second set of tool paths, including:
determining a revised order of the elements of the mesh to deposit for additively producing the part based on the second set of tool paths;
for each of the elements of the mesh in the revised order that the elements are determined to be deposited, determining further thermal characteristics and further structural deformation characteristics of at least some of the deposited elements, in which at least one of the respective elements is structurally modified prior to determining the further thermal and structural deformation characteristics of the respective element so as to account for a volume change to the respective element resulting from structural deformation of at least one adjacent element determined from previously determined further structural deformation characteristics;
determining further stress characteristics associated with all or a portion of the part based at least in part on at least one of the further thermal characteristics, the further structural deformation characteristics or a combination thereof,
selecting which of the first and second sets of tool paths to use to produce the part with the 3D-printer based on at least one of: the thermal characteristics; the further thermal characteristics; the structural deformation characteristics; the further structural deformation characteristics; the stress characteristic; the further stress characteristics; or a combination thereof for the first and second simulations.

15. A non-transitory computer readable medium comprising executable instructions that when executed, cause at least one processor to:
carry out a first simulation of a part being additively produced according to a first set of tool paths that correspond to instructions usable to drive a 3D-printer to move a laser to additively produce the part, including by:
determining a mesh of the part that is comprised of a plurality of three dimensional (3D) elements;
determining an order of the elements of the mesh to deposit for additively producing the part based on the first set of tool paths;
simulating an incremental deposit of each of the elements of the mesh in the order that the elements are determined to be deposited, including determining for each incremental deposit of an additional respective element, thermal characteristics and structural deformation characteristics of the deposited elements, in which at least one of the respective elements is structurally modified prior to determining the thermal and structural deformation characteristics of the respective element so as to account for a volume change to the respective element resulting from structural deformation of at least one adjacent element determined from previously determined structural deformation characteristics; and
select, from among the first set of tool paths and a second set of tool paths, to use to produce the part through the 3D-printer based on the first simulation of the part being additively produced according to the first set of tool paths.

16. The non-transitory computer readable medium of claim 15, wherein the mesh corresponds to a hexahedral mesh comprised of the elements that are hexahedrons, and wherein the executable instructions further cause the at least one processor to:
determine element dimensions based on data corresponding to a laser width and a layer thickness for the 3D-printer; and
receive computer-aided design (CAD) data defining a 3D model of the part,
wherein the mesh is determined based on the determined element dimensions and the 3D model of the part, wherein the order that the elements are deposited is determined based on a determination as to which elements of the mesh intersect with a laser beam of the laser of the 3D-printer as the 3D-printer operates to deposit material onto the part based on the first set of tool paths.

17. The non-transitory computer readable medium of claim 15, wherein the determined thermal characteristics include data that specifies temperature changes of deposited elements, wherein the determined structural deformation characteristics include data that specifies structural changes of deposited elements determined based at least in part on the data that specifies temperature changes of the deposited elements, and wherein the executable instructions further cause the at least one processor to:

determine stress characteristics associated with all or a portion of the part based at least in part on at least one of the thermal characteristics, the structural deformation characteristics, or a combination thereof.

18. The non-transitory computer readable medium of claim 15, wherein the executable instructions further cause the at least one processor to:

based on at least one of the thermal characteristics, the structural deformation characteristics, stress characteristics or a combination thereof determined for one or more of the respective elements, at least one of selecting the second set of tool paths, generating the second set of tool paths, or a combination thereof, wherein the second set of tool paths is usable to drive the 3D-printer to additively produce the part and wherein the second set of tool paths is different than the first set of tool paths.

19. The non-transitory computer readable medium of claim 15, wherein the executable instructions further cause the at least one processor to:

carry out a second simulation of the part being additively produced according to the second set of tool paths, including by:

determining a revised order of the elements of the mesh to deposit for additively producing the part based on the second set of tool paths;

for each of the elements of the mesh in the revised order that the elements are determined to be deposited, determining further thermal characteristics and further structural deformation characteristics of at least some of the deposited elements, in which at least one of the respective elements is structurally modified prior to determining the further thermal and structural deformation characteristics of the respective element so as to account for a volume change to the respective element resulting from structural deformation of at least one adjacent element determined from previously determined further structural deformation characteristics;

determine further stress characteristics associated with all or a portion of the part based at least in part on at least one of the further thermal characteristics, the further structural deformation characteristics or a combination thereof, select which of the first and second sets of tool paths to use to produce the part with the 3D-printer based on at least one of: the thermal characteristics; the further thermal characteristics; the structural deformation characteristics; the further structural deformation characteristics; the stress characteristic; the further stress characteristics; or a combination thereof for the first and second simulations.

20. The non-transitory computer readable medium of claim 15, wherein the instructions further cause the at least one processor to generate instructions corresponding to the first set of tool paths or the second set of tool paths of which was selected to produce the part through the 3D printer and that are usable to drive the operation of the 3D-printer to additively manufacture the part.

\* \* \* \* \*